United States Patent [19]
Saunders et al.
[11] 4,420,536
[45] Dec. 13, 1983

[54] SELF-BONDING MAGNET WIRE

[75] Inventors: Hollis S. Saunders; Lionel J. Payette, both of Fort Wayne, Ind.
[73] Assignee: Essex Group, Inc., Fort Wayne, Ind.

[21] Appl. No.: 324,228
[22] Filed: Nov. 23, 1981
[51] Int. Cl.³ .......................... B32B 27/00; H01B 7/00
[52] U.S. Cl. ................................ 428/383; 174/110 N; 174/120 SR; 428/379
[58] Field of Search ........................ 428/379, 375, 383; 174/110 N, 110 SR, 110 PM, 120 SR; 528/335; 29/596

[56] References Cited

U.S. PATENT DOCUMENTS

| | | | |
|---|---|---|---|
| 2,130,948 | 9/1938 | Carothers | 528/335 X |
| 2,278,350 | 3/1942 | Graves | 528/335 X |
| 4,004,063 | 1/1977 | Peterson et al. | 428/383 |
| 4,216,263 | 8/1980 | Otis et al. | 174/120 SR X |
| 4,273,808 | 6/1981 | Neirynck et al. | 427/140 X |
| 4,350,737 | 9/1982 | Saunder et al. | 174/110 N |

FOREIGN PATENT DOCUMENTS

| | | | |
|---|---|---|---|
| 53-106486 | 9/1978 | Japan | 174/110 N |
| 55-80204 | 6/1980 | Japan | 174/120 SR |

*Primary Examiner*—Lorraine T. Kendell
*Attorney, Agent, or Firm*—Harry J. Gwinnell

[57] ABSTRACT

A selfbonding magnet wire is disclosed having an outer bondable coating of nylon 612. In addition to improved bonding properties, the magnet wire has improved moisture resistance and solvent resistance so as to be useful in hermetic motor environment. Overcoated with appropriate external and/or internal lubricant, it can also be power inserted in locking wire size range. The nylon 612 can be used as a sole insulation coat or part of a multicoat system, for example, overcoated on polyester or polyamideimide overcoated polyester. The nylon 612 can also be used as a blend with nylon 11.

5 Claims, No Drawings

SELF-BONDING MAGNET WIRE

DESCRIPTION

TECHNICAL FIELD

The field of art to which this invention pertains is coated electrical conductors, and specifically selfbonding magnet wire.

BACKGROUND ART

In coil wound motors it is common, after winding to immerse the wound coil into a subsequently cured varnishing liquid thereby impregnating the coil and securing the wires in place. This securing is to ensure that the individual wires do not become loose, noisy, and become subject to early failure through vibration and other movement. Conventional varnishing also improves the wound coil's resistance to moisture, insulates any nicks or scrapes caused in winding, and eliminates direct exposure of the windings to dust, dirt, grease and oil. The state of the art has progressed to the point where it has been found that coil wires useful in this environment can be made with outer coatings which are selfadhering or selfbonding, thus eliminating the need for a separate varnishing step. For example, note U.S. Pat. Nos. 3,553,011; 3,953,649; 3,975,571; 4,163,826; and 4,216,263.

As in other areas, once materials which could be used as selfbondable magnet wires were uncovered, users began to look to wire manufacturers for improved wire properties in this area with a view towards eliminating the varnishing operation entirely,, e.g. for cost purposes. Moisture resistance is a significant consideration. The ability to reliably power insert coils of such magnet wire, is also important. Furthermore, in the area of hermetic motors, a selfbonding magnet wire insulation material which could withstand the rigors of the hermetic motor environment, for example, heat resistance, solvent resistance, etc. has hitherto not been used.

Accordingly, what is needed in this art is a selfbonding magnet with suitable chemical and mechanical properties to provide good moisture resistance, power insertability, and usefulness in a hermetic motor environment.

DISCLOSURE OF INVENTION

The present invention is directed to a selfbonding magnet wire with improved moisture resistance, and which is also capable of reliable power insertion into coil slots. These wires are also chemically stable in hermetic motor environment. An outer insulating layer of nylon 612 allows magnet wires according to the present invention to accomplish these results.

The foregoing, ad other features and advantages of the present invention, will become more apparent from the following description.

BEST MODE FOR CARRYING OUT THE INVENTION

The nylon according to the present invention is a combination of an amide having six carbon atom chain length with a twelve carbon atom chain length acid (hexamethylenediamine and dodecanedioic acid). This material can either be made by conventional nylon synthesis (note *Nylon Plastics* by Melvin I. Kohan) or obtained commercially from nylon manufacturers such as E. I. duPont de Nemours and Co. Inc., Emser Industries Inc., or Plexchem International Inc. Physical properties of the polymer include a melting point of 206° C.–215° C., a flexural modulous (ASTM-D790) of 290 at 23° C. and a specific gravity of 1.06 to 1.08.

Although any amount of the nylon 612 can be applied as the outer layer of the magnet wire (e.g. as much as 50% by coating weight or more) the nylon should be used so as to constitute at least about 15% by weight of the total film insulation and preferably about 20% to about 30% by weight And while the nylon can be used as the sole insulation coat, it is more typically used as part of a multicoat system over a base coat of conventionally used polyester, polyurethane, polyamideimide, polyesterimide, etc. insulation coats. A particularly attractive product includes a nylon 612 overcoated polyamideimide coated on a previously applied polyester basecoat. This material has properties which make it particularly suitable for use in hermetic motors. Currently the most used magnet wire for hermetic motors is polyamide-imide overcoated THEIC based polyester. This wire has been found to provide the best combination of wire properties for this environment including such things as film toughness for winding, chemical resistance to refrigerant (including blister resistance, refrigerant extractables and dielectric strength after exposure to refrigerant). The nylon 612 in addition to providing self bonding properties to such wire, does not increase the chemical solubility or refrigerant blistering of such wire, increases windability, provides at least equal power insertability and when bonded is chemically stable in the refrigerant.

As the electrically conducting base material, although any electrical conductor may be coated with the material of the present invention, the invention is particularly adapted to wire and specifically magnet wire. The wire is generally copper or aluminum ranging anywhere from 2 mils to 128 mils in diameter with wires 10 mils to 64 mils being the most commonly treated wires according to the present invention. The thickness of the insulating layers, including the nylon 612, generally ranges from about 0.2 to about 2 mils with 0.7 mil to 1.6 mils being preferred.

The nylon 612 according to the present invention can be applied by any conventional means such as coating die, roller or felt application with viscosity adjustments with conventional enamel solvents (such as mixtures of cresylic acid, phenols and hydrocarbons) made accordingly. For example, viscosities (at 30° C.) of about 2000 cps are preferred for coating die application, 100 cps to 200 cps for roller application, and 40 cps to 100 cps for felt application. Conventional curing ovens are used to dry and melt the nylon coatings and speeds of 50–60 feet per minute and preferably about 55 feet per minute are used for both coating and subsequent heat treatment (e.g. for 18 AWG wire). Inlet oven temperatures of about 500° F.–700° F. (260° C.–371° C.) and preferably about 580° F. (304° C.), and outlet oven temperatures of about 800° F.–1100° F. (427° C.–593° C.) and preferably about 900° F. (482° C.) are used for the heat treatments.

For power insertion purposes, an external lubricant (with or without an internal lubricant) can also be applied by any conventional means such as coating dies, rollers, or felt applicators. The lubricants internal and external are preferably of the type disclosed in commonly assigned copending U.S. applications Ser. Nos. 312,214 and 312,599 filed Oct. 19, 1981, now U.S. Pat. No. 4,350,737 the disclosures of which are incorporated by reference. As decribed therein, the preferred method of application utilizes a low boiling hydrocarbon solvent solution of the lubricant which can be applied with felt applicators and air dried, allowing a very thin "washcoat" film of lubricant to be applied to the wire. While the amount of lubricant in the coating composition may vary, it is most preferred to use approximately 1% to 3% of the lubricant dissolved in an aliphatic hydrocarbon solvent. And while any amount of lubricant coating desired can be applied, the coating is preferably applied to represent about 0.003% to about 0.004% by weight based on total weight of wire for copper wire and about 0.009% to about 0.012% for aluminum wire. Also as described in copending applications Ser. No. 312,214 and Ser. No. 312,599, now U.S. Pat. No. 4,350,737 an internal lubricant can be used in the nylon layer. The external lubricant can be any conventionally used lubricant but is preferably either a mixture of paraffin wax, hydrogenated triglyceride and ester of fatty alcohols and fatty acids or a mixture of paraffin wax and hydrogenated triglyceride. The internal lubricant can be either esters of fatty alcohols and fatty acids, hydrogenated triglyceride, or mixtures thereof. If an internal lubricant is used, it is preferably used so as to represent about 0.05% to 8% by weight of the nylon layer. The use of the nylon 612 in conjunction with such lubricants in addition to resulting in a product which is not subject to crazing from the solvents in the lubricant solution results in a magnet wire with improved windability which can be power inserted into coil slots with a much lower failure rate than other bondable magnet wires even in the locking wire size range.

EXAMPLE 1

A copper wire approximately 40.3 mils in diameter was coated with a first insulating layer of THEIC based polyester condensation polymer of ethyleneglycol, trishydroxyethylisocyanurate and dimethylterephthalate. Over this was applied a layer of nylon 612. The total insulating layer was approximately 1.6 mils thick with about 75%-85% of the coating weight constituted by the polyester basecoat and about 15%-25% by the nylon topcoat.

EXAMPLE 2

A copper wire approximately 40.3 mils in diameter was coated with a first insulating layer of the THEIC based polyester as described in Example 1. Over this was applied a layer of a polyamideimide condensation polymer of trimelletic anhydride and methylenediisocyanate. The total thickness of the insulating layers were approximately 1.4-1.5 mils thick with 75% to 90% of the coating weight constituted by the polyester basecoat, and 10% to 25% by the polyamideimide topcoat. Over the polyamideimide topcoat was applied a layer of nylon 612. The thickness of the nylon 612 was approximately 0.6-0.7 mils and constituted about 20% by weight of the total weight of the insulating layers.

In addition to the selfbonding properties, adequate bond strength, power insertability, and chemical stability (e.g. Freon® solvent resistance) in a hermetic motor environment, the nylon 612 also provides improved moisture resistance over other conventional nylons which could be used in this area.

In a test developed by the Essex Magnet Wire and Insulation Division of the Essex Group of United Technologies Corporation to determine the relative life of magnetic wire coatings and varnishes under severe moisture operating conditions five samples of 18 AWG copper wire each 9 feet long were coated with THEIC based polyester and polyamide-imide as in Example 2. Over each of the five samples was applied a nylon layer approximately 0.6-0.7 mils thick as follows: Sample A—nylon 66, Sample B—nylon 11, Sample C—a mixture of 50% by weight nylon 11 and 50% by weight nylon 612, Sample D—nylon 612, Sample E—75% by weight nylon 612 and 25% by weight nylon 11, Sample F—nylon 11,12 (a random copolymer) about 60% of nylon 11 and about 40% of nylon 12 by weight of each. The samples of magnet wire were submerged in a conductive (3% NaCl in deionized water) bath and a constant voltage (500 volts) applied between the wire and the water bath. The voltage source has a running time meter in the circuit that is controlled by a fault relay. The end point of the test is determined when the current leakage between the wire and the water bath reaches the preset current (100 milliamps) necessary to trip the fault relay and stop the running time meter. As can be seen from the Table, samples according to the present invention (Samples D and E) clearly out performed the other conventionally used nylons tested.

TABLE

| Sample | Time to Failure (hours) |
|---|---|
| A | 1.1 |
| B | 2.2 |
| C | 3.3 |
| D | 7.1 |
| E | 5.7 |
| F | 3.3 |

As can be seen from the Table, not only do the nylon 612 self-bonding magnet wire overcoatings alone provide improved properties according to the present invention, but also in admixture with such conventionally used nylons as nylon 11 in limited amounts (preferably no higher than about 25% by weight nylon 11). Similarly, the nylon 612 can be blended with other conventionally used nylons in addition to nylon 11, such as nylon 6, nylon 66, nylon 12, nylon 6,12, nylon 11,12 etc. or mixtures thereof however with a deterioration of one or more properties such as moisture resistance, thermal shock, bond strength, etc.

Although the invention has been shown and described with respect to detailed embodiments thereof, it will be understood by those skilled in the art that various changes in form and detail thereof may be made without departing from the spirit and scope of the claimed invention.

We claim:

1. A self-bonding magnet wire comprising an electrically conducting substrate having an electrically insulating outer coating thereon consisting essentially of a layer of a blend of nylon 612 and nylon 11 wherein the nylon 11 is present in an amount up to about 25% by weight.

2. The magnet wire of claim 1 wherein said blend is the outer layer of a multicoat insulation system where said blend represents up to 50% by weight of the total coating.

3. The magnet wire of claims 1 or 2 wherein the wire has an insulating layer of polyester or polyamide-imide overcoated polyester between the substrate and said blend layer.

4. The magnet wire of claims 1 or 2 additionally containing a lubricant coated on said blend layer, or in admixture in said blend layer, or both.

5. The magnet wire of claim 4 additionally containing a lubricant coated on said blend layer, or in admixture in said blend layer, or both.

* * * * *